United States Patent
Sainis et al.

(10) Patent No.: US 9,880,646 B2
(45) Date of Patent: Jan. 30, 2018

(54) ADDRESSABLE ELECTRO-OPTIC DISPLAY

(71) Applicant: E Ink Corporation, Billerica, MA (US)

(72) Inventors: Sunil Krishna Sainis, Melrose, MA (US); Seth J. Bishop, Framingham, MA (US)

(73) Assignee: E Ink Corporation, Billerica, MA (US)

(*) Notice: Subject to any disclaimer, the term of this patent is extended or adjusted under 35 U.S.C. 154(b) by 77 days.

(21) Appl. No.: 15/045,635

(22) Filed: Feb. 17, 2016

(65) Prior Publication Data

US 2016/0239114 A1 Aug. 18, 2016

Related U.S. Application Data

(60) Provisional application No. 62/117,825, filed on Feb. 18, 2015.

(51) Int. Cl.
*G06F 3/03* (2006.01)
*G06F 3/0354* (2013.01)
*G02F 1/167* (2006.01)

(52) U.S. Cl.
CPC .......... *G06F 3/03545* (2013.01); *G02F 1/167* (2013.01); *G02F 2001/1672* (2013.01); *G02F 2001/1678* (2013.01)

(58) Field of Classification Search
None
See application file for complete search history.

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II | |
| 6,054,071 A | 4/2000 | Mikkelsen, Jr. | |
| 6,055,091 A | 4/2000 | Sheridon | |
| 6,097,531 A | 8/2000 | Sheridon | |
| 6,128,124 A | 10/2000 | Silverman | |
| 6,130,774 A | 10/2000 | Albert | |
| 6,137,467 A | 10/2000 | Sheridon | |
| 6,144,361 A | 11/2000 | Gordon, II | |
| 6,147,791 A | 11/2000 | Sheridon | |
| 6,172,798 B1 | 1/2001 | Albert | |
| 6,184,856 B1 | 2/2001 | Gordon, II | |
| 6,225,971 B1 | 5/2001 | Gordon, II | |
| 6,232,962 B1* | 5/2001 | Davis ............. | G06F 3/03545 178/18.04 |

(Continued)

FOREIGN PATENT DOCUMENTS

WO    2013049286    4/2013

OTHER PUBLICATIONS

Wood, D., "An Electrochromic Renaissance?" Information Display, 18(3), 24 (Mar. 2002) Mar. 1, 2002.

(Continued)

*Primary Examiner* — Joseph Haley
(74) *Attorney, Agent, or Firm* — Brian D. Bean

(57) ABSTRACT

A writing implement is described that dispenses a liquid colorant and produces a magnetic field. The magnetic field may be directed to an electronically driven display having a particle that is responsive to a magnetic field, such as an electrophoretic display, thereby changing an optical state of the display.

17 Claims, 9 Drawing Sheets

(56) References Cited

U.S. PATENT DOCUMENTS

| | | |
|---|---|---|
| 6,241,921 B1 | 6/2001 | Jacobson |
| 6,271,823 B1 | 8/2001 | Gordon, II |
| 6,301,038 B1 | 10/2001 | Fitzmaurice |
| 6,672,921 B1 | 1/2004 | Liang |
| 6,788,449 B2 | 9/2004 | Liang |
| 6,866,760 B2 | 3/2005 | Paolini, Jr. |
| 6,870,657 B1 | 3/2005 | Fitzmaurice |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,075,502 B1 | 7/2006 | Drzaic |
| 7,116,318 B2 | 10/2006 | Amundson et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,411,719 B2 | 8/2008 | Paolini, Jr. et al. |
| 7,420,549 B2 | 9/2008 | Jacobson |
| 7,535,624 B2 | 5/2009 | Amundson et al. |
| 7,679,814 B2 | 3/2010 | Paolini, Jr. et al. |
| 7,791,789 B2 | 9/2010 | Albert |
| 7,839,564 B2 | 11/2010 | Whitesides et al. |
| 8,009,348 B2 | 8/2011 | Zehner |
| 8,319,759 B2 | 11/2012 | Jacobson |
| 2005/0175390 A1 | 8/2005 | Wehmeyer |
| 2008/0297489 A1 | 12/2008 | Funo et al. |
| 2014/0085269 A1 | 3/2014 | Armstrong-Muntner |
| 2014/0333987 A1* | 11/2014 | Keam .................... G02F 1/167 359/296 |
| 2016/0139694 A1* | 5/2016 | Go ........................... G06F 3/16 345/179 |
| 2016/0306485 A1* | 10/2016 | Joung .................. G06F 3/0414 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

PCT/US2016/018206; International Search Report and Written Opinion; Korean Intellectual Property Office, dated Jun. 1, 2016.

* cited by examiner

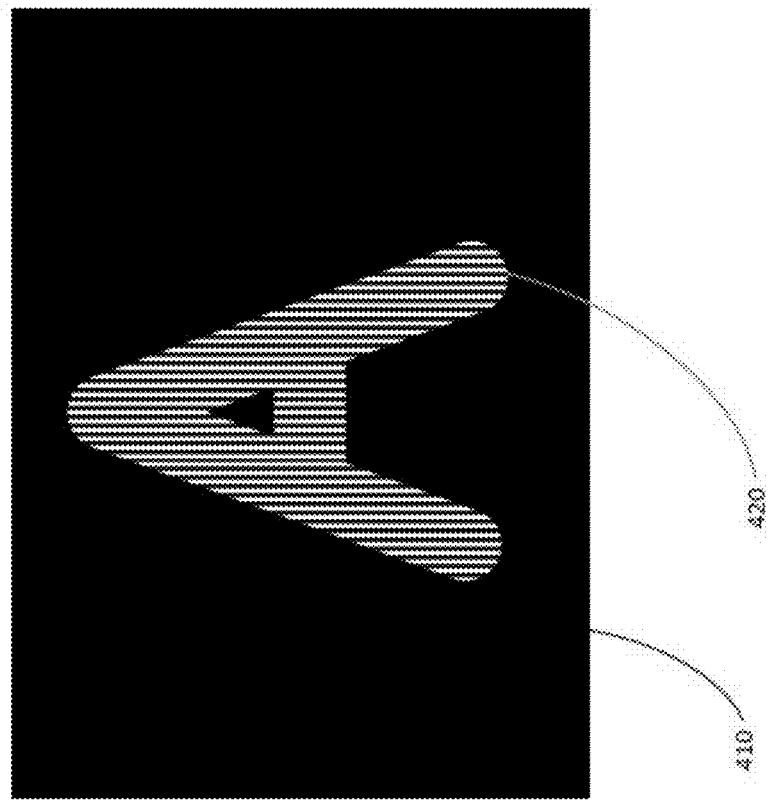

Inner Glow

Outer Glow

Inner Glow

Outer Glow

ADDRESSABLE ELECTRO-OPTIC DISPLAY

RELATED APPLICATION

This application claims priority to and the benefit of U.S. Patent Application No. 62/117,825, filed Feb. 18, 2015. The priority application and all applications referenced below are incorporated herein in their entireties.

BACKGROUND

The technology described herein relates to magnetically responsive, particle-based electro-optic displays that can be addressed with a specialized instrument (stylus, marker, or print head) and related apparatus and methods.

A variety of systems are available for addressing an electro-optic display with a stylus. For example, a stylus can be used to take notes on certain tablets. However, in these systems, the electro-optic display must be able to detect the position of the stylus in order to produce the desired result, e.g., drawing a line. As a user passes the stylus over a surface of the electro-optic display, the electro-optic display activates pixels corresponding to those over which the stylus passed, based on the position of the stylus detected by the electro-optic display. Some magnetically responsive displays may be addressed with a stylus that contains a magnet and/or produces a magnetic field, however, these displays also require location techniques to determine the location of the stylus.

BRIEF SUMMARY

Aspects of the present application provide a writing implement that both dispenses a colorant and produces a magnetic field. The magnetic field may be directed to an electronically driven display, which may be a particle-based electronically driven display having a particle responsive to a magnetic field, such as an electrophoretic display. The magnetic field may cause a change in an optical state of the display within an area local to the writing implement. In addition, the colorant may be dispensed onto a surface of the display in proximity to, or atop, the area that has undergone a change in optical state. In some embodiments, the electronically driven display is a large area electronically-driven display, for example having a diagonal dimensional greater than 40 inches, greater than 50 inches, greater than 70 inches, or having other suitable sizes.

According to an aspect of the present application, a writing apparatus is provided comprising an elongate tubular member having a first end and second end and being sized to be hand-held. The apparatus further comprises a magnet coupled to the tubular member, and a tip coupled to the first end of the tubular member, the tip configured to dispense a colorant and to produce a magnetic field while the colorant is dispensed. The apparatus may be used in conjunction with an electronically driven display to cause a change in an optical state of the display within an area local to the writing implement. The electronically driven display may include particles that are magnetically responsive.

According to an aspect of the present application, an apparatus is provided comprising a writing implement having a writing end, the writing end configured to both dispense a liquid colorant and produce a magnetic field. The apparatus may be used in conjunction with an electronically driven display to cause a change in an optical state of the display within an area local to the writing implement. The electronically driven display may include particles that are magnetically responsive.

In another aspect, the application discloses a system for displaying information. The system includes an apparatus configured to both dispense a liquid colorant and produce a magnetic field at a desired location, and an electrophoretic display containing electrophoretic particles configured to change state in response to application of the magnetic field. When the electrophoretic display is addressed with the apparatus, a liquid colorant is deposited on a surface of the electrophoretic display and the state of the electrophoretic display behind the colorant changes. In some embodiments, the amount of change in the state of the electrophoretic display is a function of an angle between a long axis of the apparatus and the surface of the electrophoretic display. In other embodiments, e.g., wherein the apparatus includes an electromagnet, the amount of change in the state of the electrophoretic display is a function of a current provided to an electromagnet in the apparatus. In exemplary embodiments, the apparatus can be a dry-erase marker having a magnetic tip or an ink-jet head having a magnet.

In another aspect, the invention provides a method for addressing an electro-optic display comprising a magnetically-responsive pigment, the method including simultaneously providing colorant and a co-aligned magnetic field to the electro-optic display. In some embodiments, the electro-optic display is an electrophoretic display. In some embodiments, an electric field is also applied to the electrophoretic display at the time the colorant and the magnetic field are applied.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 4 illustrates the surface of an electronically driven display after colorant is dispensed to a region of the surface and a change in an optical state is produced beneath the region, according to some embodiments;

DETAILED DESCRIPTION

Figure 1:
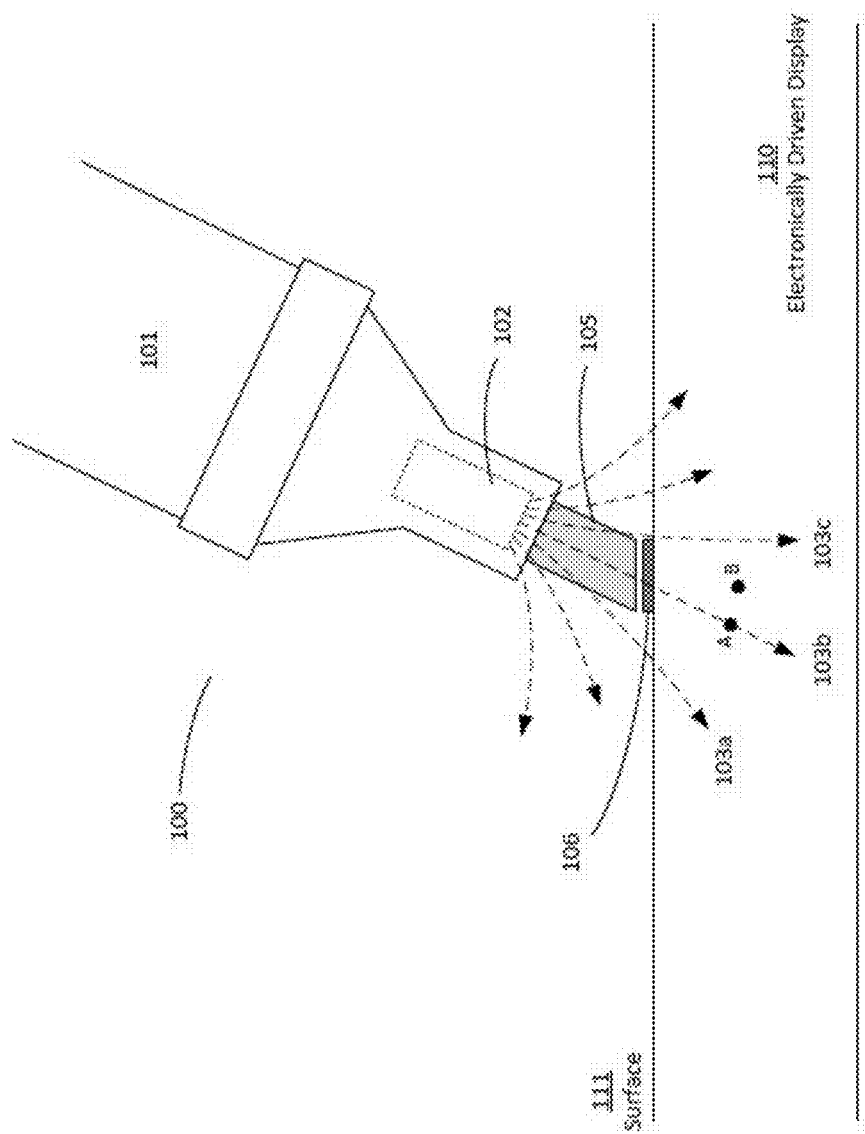
FIG. 1 illustrates a writing implement that dispenses colorant and produces a magnetic field, according to some embodiments.

Aspects of the present application relate to a writing implement that dispenses a colorant and produces a magnetic field. The magnetic field may be directed to an electronically driven display, which may be a particle-based electro-optic displays that are electrically and magnetically addressable, and in at least some embodiments configured to provide both global and local addressing capabilities. Alternatively, the magnetic field may be directed to a magnetically responsive display to provide local addressing capabilities.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see the aforementioned MEDEOD applications;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Other types of electro-optic media may also be used in the displays of the present invention.

Aspects of the present application relate to particle-based electro-optic displays which are electrically and magnetically addressable, and in at least some embodiments configured to provide both global and local addressing capabilities. The global addressing capability may be used to create a solid color state, for example white or black, and therefore be considered an "erase" state. The global addressing state may be electrically controllable. For example, the display may include electrodes on opposing sides of a particle-based ink layer of the display, and the electrodes may be operated to create a suitable electric field to set the ink to a uniform color state. The display may include a controller for controlling the electric field presented to the electrophoretic particles. The controller may apply a static electric field or a time-dependent electric field, i.e., a waveform. The local addressing capability may be provided by a writing implement creating a rotating and/or oscillating or static (DC) magnetic field. The term "writing implement" as used herein includes a stylus.

The particle-based electro-optic display may include one or more pigment types. In a single-pigment display, the pigment is both electrically and magnetically controllable. In a multi-pigment display, at least one of the pigment types may be both electrically and magnetically controllable. An example of a multi-pigment display is a display including white pigment particles and black pigment particles. The black pigment particles may be both electrically and magnetically controllable, as an example.

Aspects of the present application relate to a writing implement that dispenses a colorant and produces a magnetic field. The magnetic field may be directed to an electronically driven display, which may be a particle-based electronically driven display, such as an electrophoretic display. The magnetic field may cause a change in an optical state of the display within an area local to the writing implement. In some embodiments, adjusting one or more angles between the writing implement and an electronically driven display may adjust relative locations of surface regions onto which colorant is dispensed and regions of the display that change an optical state as a result of the magnetic field produced by the writing implement. Accordingly, various effects may be produced by the writing implement by selecting such angles during use. The term "writing implement" as used herein includes pens and markers, including both permanent and non-permanent markers.

The electronically driven display may, according to some embodiments, be in a black state prior to a change in optical state produced by a writing implement that produces a magnetic field. In a multi-pigment display that includes white and black pigment particles, black pigment particles may, in some states, be located toward the front of the display such that incident light is largely absorbed by the black particles. A magnetic field produced by a writing implement as described herein may change an optical state of the black particles and/or white particles of the display such that incident light becomes largely reflected by the white particles, and is substantially no longer absorbed by the black particles. The change in optical state may include movement of the white and/or black particles within the display.

The electronically driven display may, according to some embodiments, include black pigment particles that are magnetically responsive and white pigment particles that are substantially non-magnetically responsive (though either or both may be electrically responsive). A magnetic field produced by a writing implement as described herein may cause black pigment particles to alter their positions such that, in a region of the display local to the magnetic field, the reflective properties of the display are altered. According to some embodiments, black pigment particles may be configured to form chains when exposed to a magnetic field produced by a writing implement as described herein such that they substantially no longer absorbed light incident to the display. In such a case, the response of the black pigment particles to the magnetic field act like a "shutter," effectively altering their state from a "shutter closed" state in which incident light is largely absorbed by the black particles, to a "shutter open state" in which the black pigment particles substantially no longer absorb light incident to the display.

According to some embodiments, a writing implement may dispense liquid colorant in addition to producing a magnetic field. The colorant may be dispensed in addition to other materials, such as a binder and/or solvent, such that the colorant adheres to a surface with which the writing implement is brought into contact. The writing implement may include a writing tip that dispenses the colorant and a reservoir that stores the colorant before being delivered to the tip for dispensing onto a surface. Colorant may be dispensed onto any suitable surface of a display, including but not limited to glass or plastic (e.g., Plexiglas).

According to some embodiments, a writing implement may produce a magnetic field using one or more permanent magnets. The magnet may be embedded within the writing tip. The position and strength of the magnet may be optimized so as to produce a defined magnetic field inside the display to address the desired area only.

A writing implement as described herein may, according to some embodiments, be configured to produce colorant of only a single color. In such cases, a user may utilize multiple such writing implements in order to apply different colors to one or more displays. According to some embodiments, a writing implement as described herein may be configured to produce colorants of more than one color. In such cases, the writing implement may be configured to produce a desired color of the more than one colors by a user such that a user may produce different colors on one or more displays using the same writing implement.

The aspects and embodiments described above, as well as additional aspects and embodiments, are described further below. These aspects and/or embodiments may be used individually, all together, or in any combination of two or more, as the application is not limited in this respect.

FIG. 1 illustrates a writing implement that dispenses colorant and produces a magnetic field, according to some embodiments. Writing implement 100 includes body section 101, magnet 102 and tip 105. In the example of FIG. 1, writing implement 100 has deposited colorant 106 onto a surface 111 of electronically driven display 110. In addition, the magnet 102 of the writing implement 100 produces a magnetic field on the surface of, and within, electronically driven display 110, which is depicted in the example of FIG. 1 via illustrative field lines that include field lines 103a-c. The magnetic field produced by magnet 102 may cause a change in an optical state of the electronically driven display, examples of which are discussed below.

As referred to herein, a writing "tip" includes any exposed part of a writing implement, such as writing implement 100, where at least a portion of the tip may be used to deposit colorant onto a surface. In the example of FIG. 1, tip 105 is configured to dispense colorant onto a surface with which it comes into contact. According to some embodiments, tip 105 may comprise a plurality of porous fibers, such as felt, and may serve as a carrier for colorant from a reservoir within writing implement 100 or elsewhere (not shown in the figure) to a suitable surface. In such cases, a mechanical force onto the porous fibers of the tip 105 may cause colorant held within the porous fibers to be released. It will be appreciated that tip 105, while being an exposed part of writing implement 100, may nevertheless be only a portion of a structure that extends within the body section 101 of the writing implement. In such cases, a "tip," as it is referred to herein, refers only to the exposed portion of such a structure.

According to some embodiments, writing implement 100 may be a "marker." As used herein, the term "marker" includes any writing implement that includes a source of colorant and is configured to dispense said colorant onto a surface with which the marker is brought into contact. Markers may include, but are not limited to, permanent markets, non-permanent markers (sometimes also referred to as "dry erase" or "whiteboard" markers), highlighters, felt-tip pens, or combinations thereof. According to some embodiments, colorant dispensed onto surface 111 may be wiped off the surface and/or may be removed by use of one or more solvents. Colorant may be dispensed onto any suitable surface of a display, including but not limited to glass or plastic (e.g., poly(methyl methacrylate) or polycarbonate).

Tip 105 may dispense additional materials not shown in FIG. 1 that may, for example, aid in dispensing of the colorant onto a surface and/or adhesion of the colorant onto the surface. According to some embodiments, tip 105 is configured to dispense a colorant dissolved within a solvent onto a surface, the solvent configured to evaporate from the surface after deposition. Suitable solvents may include, but are not limited to, toluene, xylene, propanol, butanol, cresols, diacetone alcohol, or combinations thereof. In some cases, the tip 105 may, in addition to or alternatively to a solvent, dispense a binder material.

In the example of FIG. 1, tip 105 is depicted as having an outer edge that is not perpendicular to its length. Having an angled tip such as this may allow a user to produce particular effects in the way colorant is deposited onto a surface and/or how the colorant is deposited relative to the regions of the electronically driven display that undergo a change in optical state due to the magnetic field produced by magnet 102 in the writing implement. However, in general a writing tip of a writing implement as described herein is not limited to any particular shape.

According to some embodiments, magnet 102 may be a permanent magnet. Accordingly, while only some field lines are shown in FIG. 1 for the purposes of clarity, it will be appreciated that the magnetic field generated by magnet 102 may extend within body section 101 (e.g., the depicted field lines 103a-c may extend from the North pole of the magnet and similar field lines may extend from the opposing, South pole of the magnet). Magnet 102 may be of any suitable type, including but not limited to neodymium iron boron, samarium cobalt, alnico, ceramic and ferrite magnets, or combinations thereof. Of particular import, the magnetic field produced by magnet 102 will be co-aligned with tip 105 so that areas of electro-optic display in proximity to the colorant applied by tip 105 will undergo an optical state transition, leading to the effects described in the figures.

According to some embodiments, magnet 102 may be an electromagnet. In such cases, a suitable power source may be located within body section 101 or otherwise, and suitable electrical connections may be coupled to the magnet 102 through the body section.

In the example of FIG. 1, magnet 102 is shown being within an end of the body section 101 and adjacent to tip 105. This location may have an advantage of being a mechanically simple location in which to install magnet 102 while still providing the magnet in proximity to surface 111. In general, however, magnet 102 may be located anywhere within the body section 101 and/or within tip 105. For example, magnet 102 may be inserted into the tip 105. Furthermore, magnet 102 may have any suitable shape, including a cuboid or a ring shape. According to some embodiments, magnet 102 will produce a field strength of between approximately 10 and 50 gauss on the suspended particles.

According to some embodiments, the magnetic field produced by magnet 102 may primarily extend outwards from the tip of the writing implement 100 along the axis of the writing implement. That is, when the writing implement 100 is not oriented perpendicular to a surface, the magnetic field strength directly under the tip of the writing implement may be less than that in a location that lies along the axis of the writing implement. In the example of FIG. 1, for example, the magnetic field may be stronger at the point labeled "A" than at the point labeled "B." One result of this may be that the regions of the surface on which colorant 106 is dispensed does not align with the regions of the electronically driven display that experience a change of state as a result of the magnetic field. This result may, in some cases, be used to produce various writing and/or drawing effects, examples of which are discussed below, but that may include, but are not limited to, drop shadow, inner shadow, bevel, emboss, outer glow, inner glow, satin finish, color/gradient/pattern overlays and/or underlays, stroke, texture, or combinations thereof.

According to some embodiments, writing implement 100 may be configured to be handheld. For example, as shown in FIG. 1, the writing implement may include an elongate tubular member configured to be handled by a user. The tubular member may be suitably sized to hold magnet 102 while still being of a size that can fit into a user's hand. For example, the tubular member may have a diameter of less than 5 cm, less than 4 cm, less than 3 cm, or any other suitable diameter, and may have a length of less than 10 cm, less than 8 cm, less than 5 cm, between 3 and 10 cm, or any other suitable length. The weight of the writing implement may not be so great as to make manipulation of the writing implement difficult.

Figure 2:
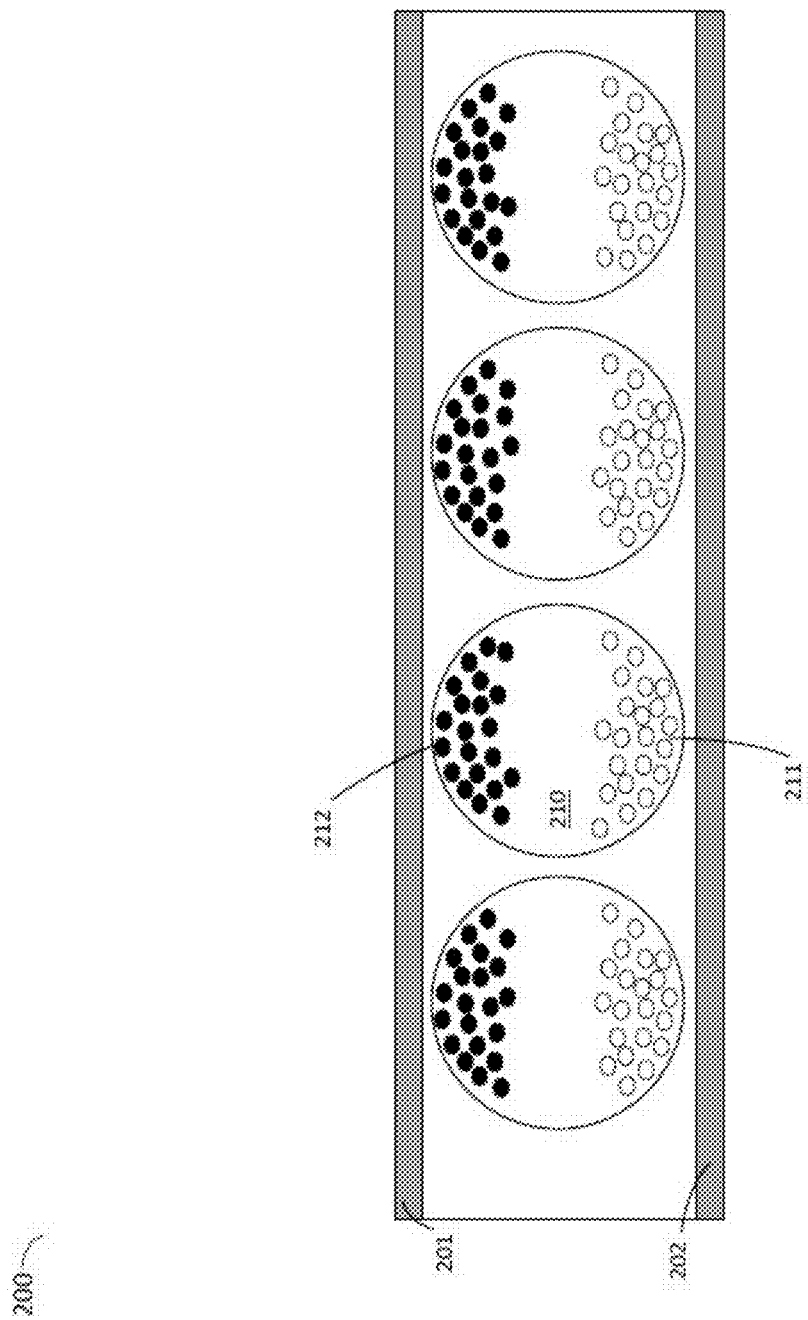
FIG. 2 depicts an electrophoretic display as one illustrative example of an electronically driven display, according to some embodiments.

FIG. 2 depicts an electrophoretic display as one illustrative example of an electronically driven display, according to some embodiments. Display 200 includes front and back electrode layers 201 and 202, respectively, and a plurality of capsules, of which capsule 210 is one example. The front electrode 201 may represent the viewing side of the display 200, as well as a side on which colorant may be dispensed using a writing implement as described herein. As such, colorant may be deposited by a writing implement directly onto electrode 201 or onto a surface, such as clear glass or plastic, located on the viewing side of the display.

In the example of FIG. 2, display 200 comprises a particle-based display medium between electrodes 201 and 202 that includes a plurality of capsules. Within capsule 210 is a liquid medium and one or more types of colored pigment particles that include white pigment particles 211 and black pigment particles 212. The pigment particles 211 and/or 212 may be controlled (displaced) with an electric field (e.g., produced by electrodes 201-202), thus making the display 200 an electrophoretic display.

In some use cases, both pigments 211 and 212 may be configured to be displaced within an electric field. For example, one of pigments 211 and 212 may be positively charged and the other pigment may be negatively charged, such that an electric field applied across capsule 210 causes the pigment particles to separate to opposing sides of the capsule. By adjusting the direction of the electric field, the pigment that is located on the viewing side of the display 200 may be selected, thereby producing either a white or a black state as viewed by a user of the display.

In some use cases, one or both of pigments 211 and 212 may move within, or otherwise respond to, a magnetic field. For example, pigment particles may align along magnetic field lines, and/or may form chains of particles. In such cases, neither, one or both of pigments 211 and 212 may be electrically charged.

In some embodiments, the display 200 may include additional components omitted from FIG. 2 for ease of illustration. For example, the display 200 may include a protective layer over the front electrode 201, and which may be configured to be suitable to receive colorant dispensed from a writing implement as described herein.

Figure 3:
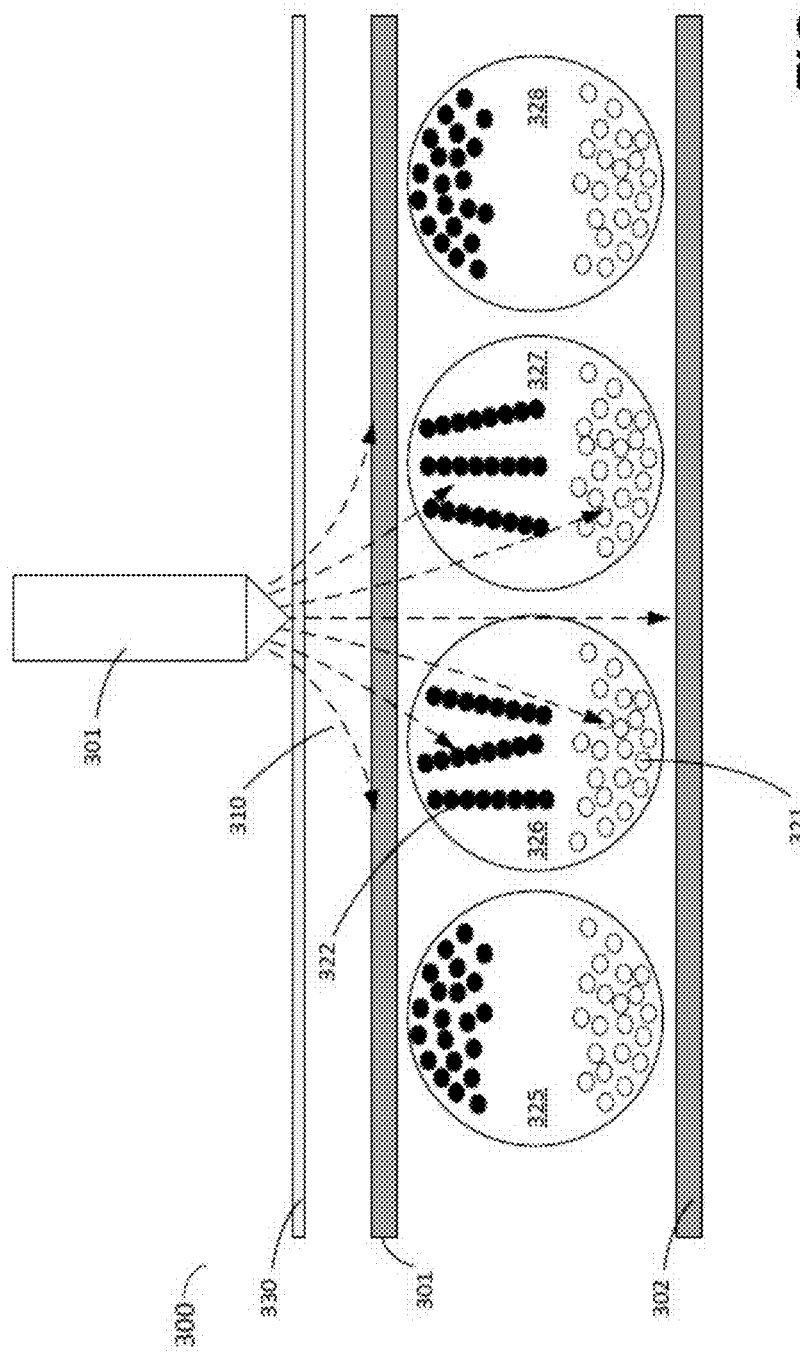
FIG. 3 depicts a writing implement causing a change in an optical state of an electrophoretic display, according to some embodiments.

FIG. 3 depicts a writing implement causing a change in an optical state of an electrophoretic display, according to some embodiments. Display 300 is an example of the type of display 200 shown in FIG. 2 that includes white reflective pigment particles 321 that do not respond to a magnetic field, and black pigment particles 322 that form chains in the presence of an magnetic field. In the example of FIG. 3, a writing implement 301 produces a magnetic field depicted in part by field lines 310 that causes black pigment particles 322 to form chains. In addition, the writing implement may deposit colorant (e.g., colorant 106 of FIG. 1 but not shown here) onto surface 330. It will be appreciated that writing implement 301 is not shown to scale relative to display 300, and that in practice the writing implement will generally be much larger than capsules 325-328 are as shown in FIG. 3. For example, the writing implement 301 may cause a change of state to black pigment particles in a large number of capsules of display 300, and not merely the two illustrative capsules 326 and 327 shown in FIG. 3.

In the example of FIG. 3, prior to application of the writing implement 301, pigment particles within capsules 320 and 321 were situated as in capsules 325 and 328, that is, with white particles on the non-viewing side, and with black particles on the viewing side, of the display 300, representing a black (or opaque) display state. When the magnetic field produced by writing implement 301 reached a sufficient intensity within capsules 326 and 327, the black pigment particles in those capsules formed chains. These black pigment particles are configured to form chains that require the pigment particles to move distances that are comparable to the inter-particle separation prior to application of the magnetic field. Accordingly, the chains may be formed quickly upon application of the magnetic field.

Due to the shape and structure of the chains of black pigment particles, light entering display 300 from the viewing side may largely pass by the black pigment chains and be reflected from the white pigment particles 321. Accordingly, in the configuration shown in FIG. 3, capsules 326 and 327 will appear white, whereas capsules 325 and 328 will appear black, on the viewing side of the display 300. The application of the magnetic field by the writing implement has thereby altered a region of the display, namely that region comprising capsules 326 and 327, from a black state to a white state. In addition, as discussed above, the writing implement may dispense a colorant onto surface 330. Surface 330 may, for example, be a protective layer located at the exterior of the display. It will be appreciated that, although FIG. 3 illustrates an example of a display that is altered from a black state to a white state by a magnetic writing implement, a display may similarly be produced that is altered from a white state to a black state by a magnetic writing implement, and that FIG. 3 is merely one illustrative example of a display with which a writing implement as described herein may be used.

Black pigment particles 322 may be restored to an unchained state (as shown in capsules 325 and 328) via any suitable means, including by application of an electric field, by application of a magnetic field different to that provided by writing implement 301, or otherwise.

FIG. 4 illustrates the surface of an electronically driven display after colorant is dispensed to a region of the surface and a change in an optical state is produced beneath the region, according to some embodiments. FIG. 4 illustrates a top-down view of a display, such as display 300 shown in FIG. 3, subsequent to application of a writing implement that dispenses colorant onto a surface of the display and produces a magnetic field within the display. In the example of FIG. 4, a user of a writing implement as described herein has drawn a letter "A" on a display in a black state.

Display 400 includes two regions: region 410 which is in a black state, and region 420, which is colored red (illustrated in black and white in the figure by vertical hatching). In the example of FIG. 4, a writing implement such as writing implement 301 shown in FIG. 3 or writing implement 100 shown in FIG. 1 has been used to both deposit red colorant within region 420 and to apply a magnetic field sufficient to change a state of the display from the black state to a white state within region 420. Since the red colorant has been deposited into region 420, this region both reflects light as a result of the exposure of reflective white pigment particles due to the change of state caused by the magnetic field of the writing implement, and appears red due to the color provided by the colorant.

FIGS. 5A-D illustrate graphical effects that may be produced on an electronically driven display using a writing implement that dispenses colorant and produces a magnetic field, according to some embodiments. As discussed above, since the magnetic field may be produced within an electronically driven display in a region different from a region on which colorant is dispensed by a writing implement as described herein, the way that the writing implement is applied to the display may alter the amount and manner in which the state of the display is changed by the magnetic field and the amount and manner in which colorant is dispensed.

Figure 5B:
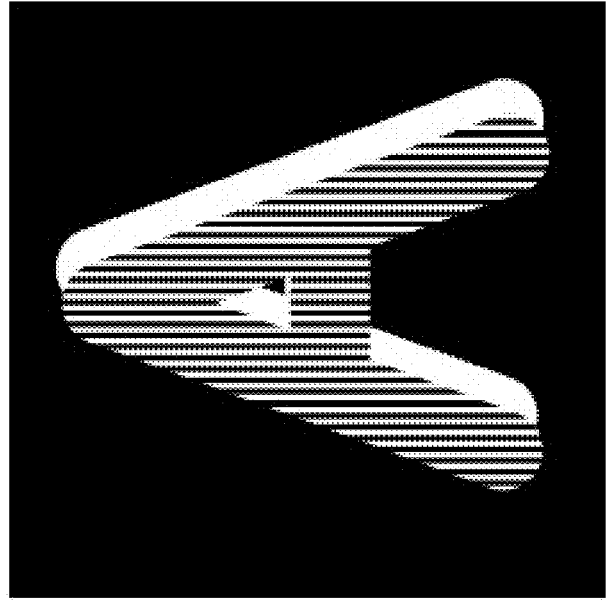
FIGS. 5A-D illustrate graphical effects that may be produced on an electronically driven display using a writing implement that dispenses colorant and produces a magnetic field, according to some embodiments.
Figure 5A:
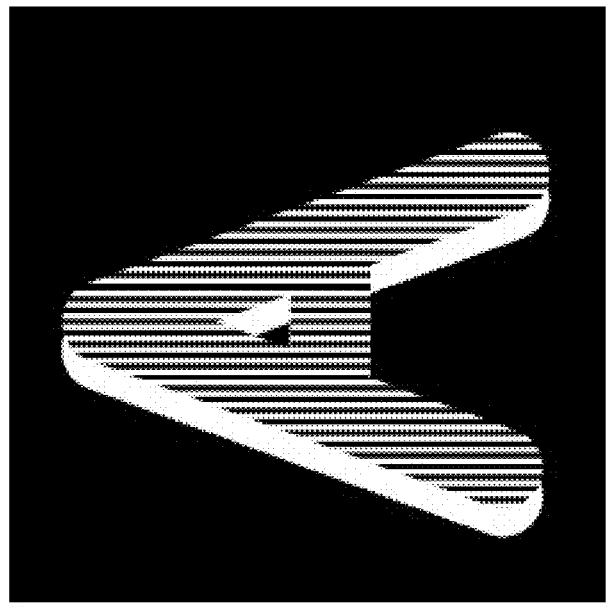

FIG. 5A illustrates a drop shadow effect where a red letter "A" appears to the right of a region that has been altered from the black state to the white state. This effect may be produced by angling a writing implement as described herein in a fixed orientation such that the magnetic field produced by the writing implement is produced to the left of where the tip of the writing implement contacts the display. For example, writing implement 100 shown in FIG. 1, in the orientation depicted in that figure, may produce the drop shadow effect shown in FIG. 5A by producing a higher magnetic field strength in a region to the left of where colorant is dispensed than in the region where the colorant is dispensed throughout production of the depicted letter "A." Similarly, FIG. 5B shows a drop shadow effect where a red letter "A" appears to the left of a region that has been altered from the black state to the white state, which may in some embodiments be produced by angling a writing implement as described herein to the left throughout production of the depicted letter "A."

Figure 5D:
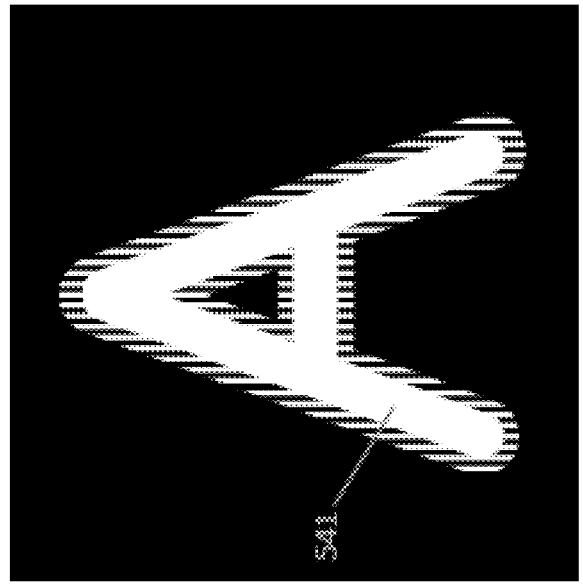
Figure 5C:
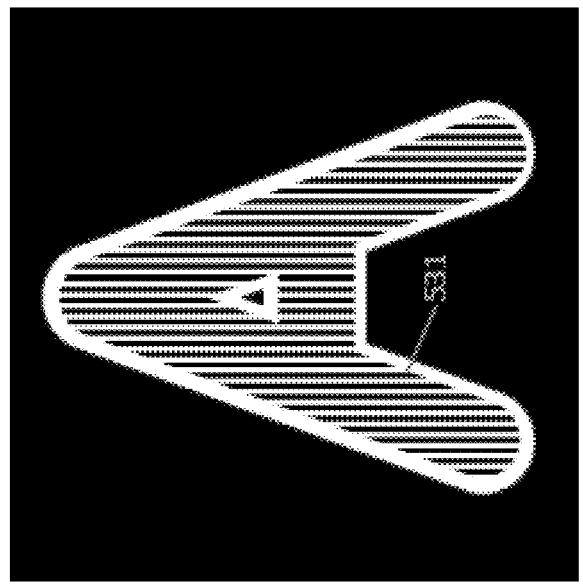

FIG. 5C depicts an outer glow effect, which in some embodiments may be produced by angling a writing implement as described herein first in one direction (e.g., to the left) and subsequently to the opposing direction (e.g., to the right) when drawing the letter "A" as depicted. Repeated strokes over the same location on the surface where red colorant has already been dispensed may not substantially alter the way in which the colorant appears, yet by using different positions of the writing implement during each stroke, further effects such as the outer glow, may be produced. For example, while writing the outer left part of the left hand side of the letter "A," a writing implement may be angled to the right, thereby producing a region to the left of the letter "A" that is changed to the white state yet on which no colorant is dispensed. Similarly, when writing the inner right part of the left hand side of the letter "A" 531 the writing implement may be angled to the left, thereby producing a region within the interior of the letter "A" that is changed to the white state yet on which no colorant is dispensed.

FIG. 5D depicts an inner glow effect, which may be produced by angling the writing implement towards the middle of the letter "A." For example, while writing the outer left part of the left hand side of the letter "A," the writing implement may be angled to the left, thereby producing a region at the exterior of the letter "A" on which colorant is dispensed, yet only altering the display to the white state in an inner region 541 of the letter "A." Similarly, when writing the inner right part of the left hand side of the letter "A," the writing implement may be angled to the right, thereby producing a region at the exterior of the letter "A" on which colorant is dispensed, yet while not further altering any regions to the white state (since region 541 was already altered to the white state).

Figure 6:
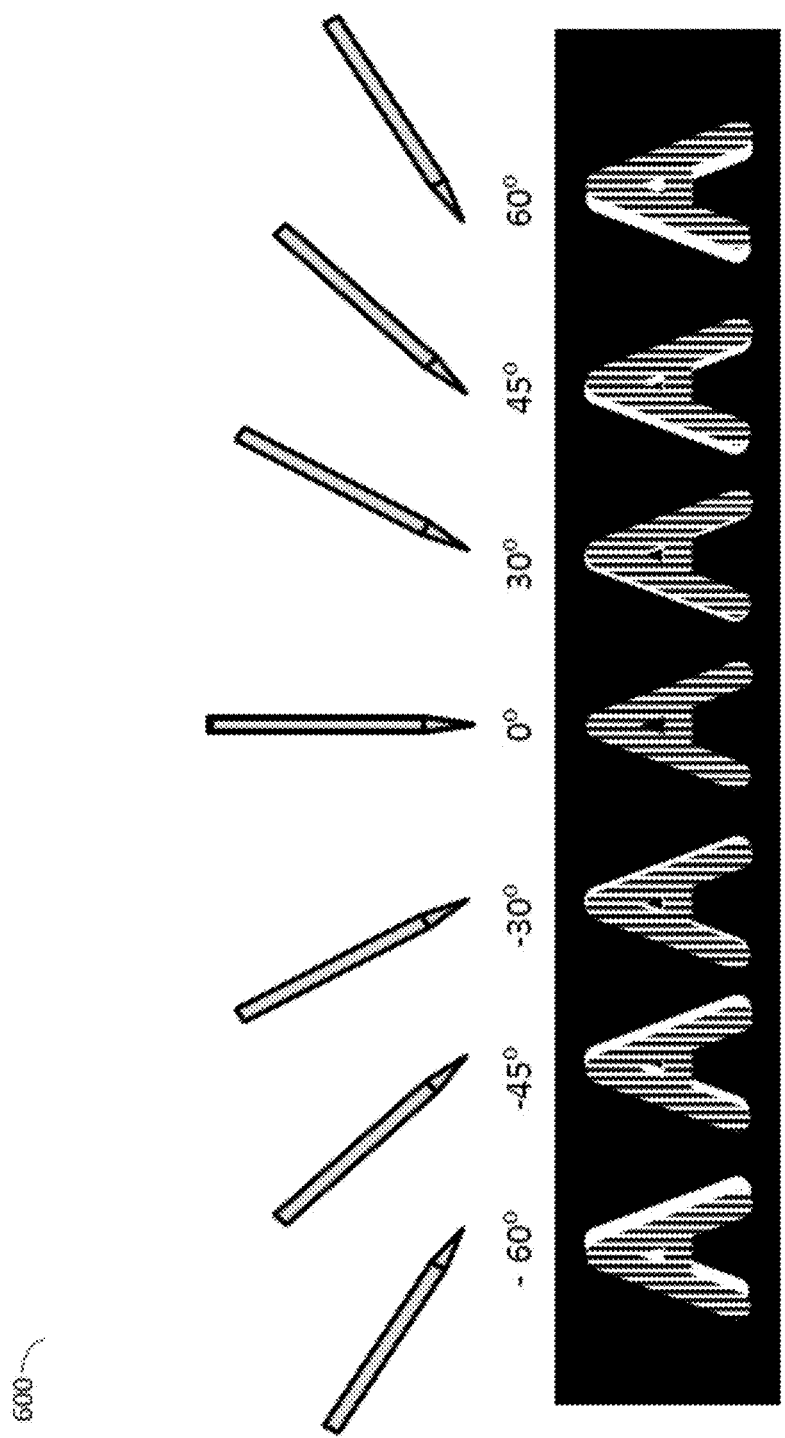
FIG. 6 illustrates results of adjusting an angle of a writing implement during dispensing of colorant and application of a magnetic field to an electronically driven display, according to some embodiments.
Figure 7B:
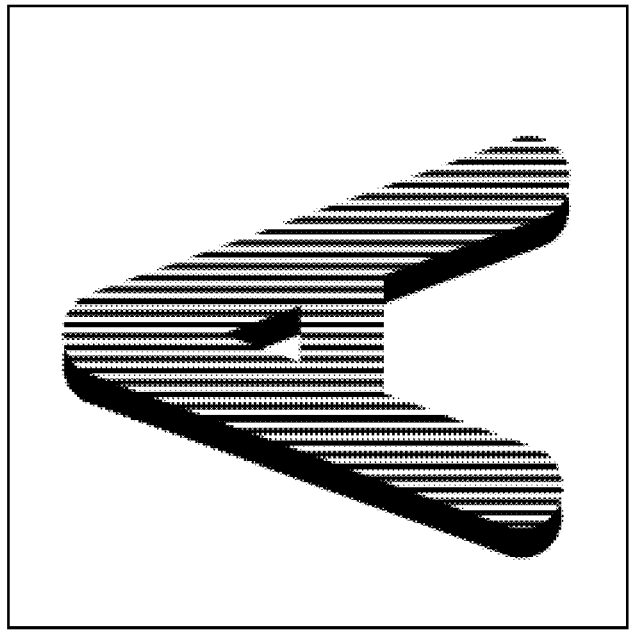
FIGS. 7A-D illustrate graphical effects that may be produced on the white state of an electronically driven display using a writing implement that dispenses colorant and produces a magnetic field, according to some embodiments.
Figure 7A:
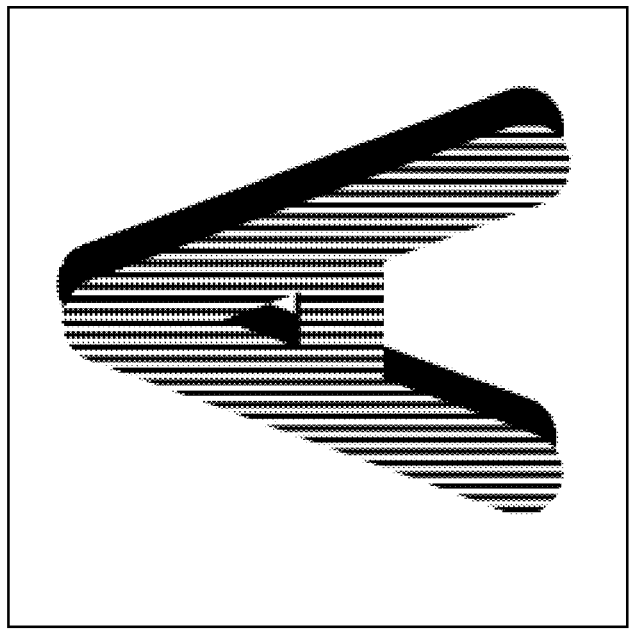
Figure 7D:
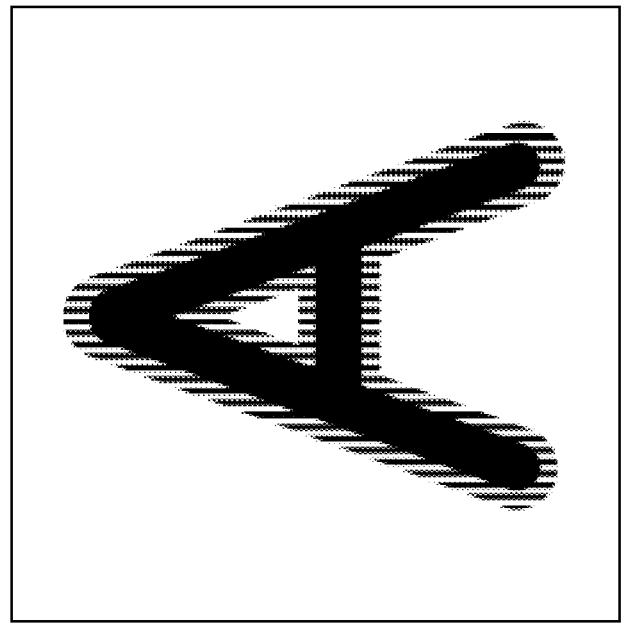
Figure 7C:
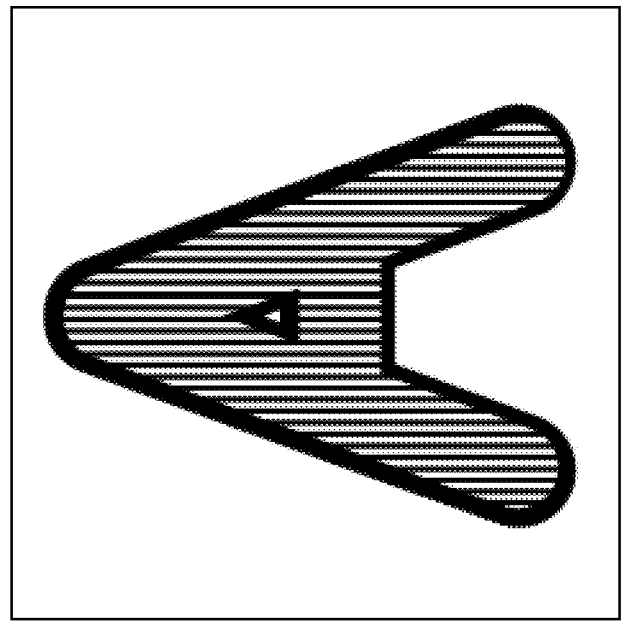

FIG. 6 illustrates results of adjusting an angle of a writing implement during dispensing of colorant and application of a magnetic field to an electronically driven display, according to some embodiments. As discussed above, in some embodiments effects such as drop shadows may be produced by altering the angle at which a writing implement as described herein contacts an electronically driven display. FIG. 6 depicts a range of one such effect and its magnitude as a function of angle. As can be seen from the figure, the separation between a red letter "A" produced by dispensing colorant onto a surface of a display and a region that is altered from a black state to a white state increases as the angle deviates to greater amounts from zero degrees, where zero degrees is a position of the writing implement that is perpendicular to the display.

FIGS. 7A-D illustrate graphical effects that may be produced on the white state of an electronically driven display using a writing implement that dispenses colorant and produces a magnetic field, according to some embodiments. FIGS. 7A-D illustrate the same effects as shown and discussed above in relation to FIGS. 5A-D, respectively, but for an electronically driven display in which a writing implement as discussed herein alters a state of the display from a white state to a black state. It will be appreciated that, in each of the use cases depicted in FIGS. 5A-D and in FIGS. 7A-D, the same writing implement may be used to produce the depicted effects. In each case, however, the display to which the writing implement is applied, and which is depicted by the figures, may be different.

Thus, it should be appreciated from the foregoing discussion that utilizing a writing implement configured to both dispense a colorant and produce a magnetic field may allow for display of color by an electronically driven display, where said color may be presented with effects that might otherwise require complex computational processing to produce.

Additionally, it should be appreciated from the foregoing discussion that a writing implement configured for an electronic display utilizing a pressure-sensitive material may be configured to dispense colorant, such as a stylus used with a Boogie Board eWriter. The display may optionally include an additional protective layer that provides for manually erasing the colorant.

While dispensing of a colorant by a marker or other type of handheld writing implement has been discussed herein, techniques described herein are not limited to such implementations. For example, dispensing of a colorant and production of a magnetic field may be achieved by an ink jet printer nozzle, an electrostatic transfer process (e.g., in a laser printer), by a thermal transfer head, or combinations thereof.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A system, comprising:
a writing apparatus including:
  an elongate tubular member having a first end and a second end and being sized to be hand-held;
  a magnet coupled to the tubular member; and
  a tip coupled to the first end of the tubular member, the tip configured to dispense a colorant and to provide a magnetic field; and
  an electrophoretic display containing electrophoretic particles configured to change state in response to application of a magnetic field produced by the magnet, wherein the state change varies as a function of the angle between the long axis of the tubular member and the surface of the electrophoretic display.

2. The system of claim 1, wherein the magnet is located proximate to the first end of the tubular member.

3. The system of claim 2, wherein the magnet is at least partially located within the tip.

4. The system of claim 1, comprising one or more additional magnets.

5. The system of claim 1, wherein the tip is further configured to dispense a solvent onto the surface.

6. The system of claim 1, wherein the colorant is a liquid.

7. The system of claim 1, wherein the tip is coupled to a reservoir that holds the colorant.

8. The system of claim 1, wherein the electro-optic display comprises a first transparent electrode.

9. The system of claim 8, wherein the electro-optic display further comprises a second transparent electrode, a first opaque electrode, or an active matrix of transistors.

10. The system of claim 9, wherein a voltage is also applied to the electrophoretic particles to produce a change state in response to application of a magnetic field produced by the magnet.

11. The system of claim 9, wherein the state of the electrophoretic particles can be changed with the application of voltage between the first transparent electrode and the second transparent electrode, the first opaque electrode, or the active matrix of transistors.

12. A system for displaying information, comprising:
an apparatus configured to both dispense a liquid colorant and produce a magnetic field at a desired location; and
an electrophoretic display containing electrophoretic particles configured to change state in response to application of the magnetic field, wherein
when the electrophoretic display is addressed with the apparatus, a liquid colorant is deposited on a surface of the electrophoretic display and the state of the electrophoretic display behind the colorant changes.

13. The system of claim 12, wherein the amount of change in the state of the electrophoretic display is a function of an angle between a long axis of the apparatus and the surface of the electrophoretic display.

14. The system of claim 12, wherein the amount of change in the state of the electrophoretic display is a function of a current provided to an electromagnet in the apparatus.

15. The system of claim 12, wherein the apparatus is a dry-erase marker having a magnetic tip.

16. The system of claim 12, wherein the apparatus is an ink-jet head having a magnet.

17. The system of claim 12, further comprising a controller configured to change the state of the electrophoretic display.

* * * * *